(12) United States Patent
Francis et al.

(10) Patent No.: US 12,203,705 B2
(45) Date of Patent: Jan. 21, 2025

(54) ENHANCEMENT OF THERMOCHEMICAL REGENERATION OPERATION

(71) Applicants: Arthur W. Francis, Clarence Center, NY (US); Hisashi Kobayashi, Bedford, NY (US); Robert L. Bell, Amherst, NY (US); Kuang-Tsai Wu, Irvine, CA (US)

(72) Inventors: Arthur W. Francis, Clarence Center, NY (US); Hisashi Kobayashi, Bedford, NY (US); Robert L. Bell, Amherst, NY (US); Kuang-Tsai Wu, Irvine, CA (US)

(73) Assignee: Praxair Technology, Inc., Danbury, CT (US)

( * ) Notice: Subject to any disclaimer, the term of this patent is extended or adjusted under 35 U.S.C. 154(b) by 517 days.

(21) Appl. No.: 17/435,611

(22) PCT Filed: Apr. 15, 2020

(86) PCT No.: PCT/US2020/028177
§ 371 (c)(1),
(2) Date: Sep. 1, 2021

(87) PCT Pub. No.: WO2020/236348
PCT Pub. Date: Nov. 26, 2020

(65) Prior Publication Data
US 2022/0146202 A1    May 12, 2022

Related U.S. Application Data

(60) Provisional application No. 62/850,079, filed on May 20, 2019.

(51) Int. Cl.
*F27D 17/00* (2006.01)
*C03B 5/235* (2006.01)
(Continued)

(52) U.S. Cl.
CPC .......... *F27D 17/004* (2013.01); *C03B 5/2353* (2013.01); *C03B 5/237* (2013.01);
(Continued)

(58) Field of Classification Search
CPC ....... C03B 5/235; C03B 5/2353; C03B 5/237; C10J 3/72; C10J 2300/1606; F23C 9/00;
(Continued)

(56) References Cited

U.S. PATENT DOCUMENTS

2017/0059250 A1*  3/2017  Kobayashi .............. C03B 5/237
2017/0121206 A1*  5/2017  Kobayashi ............ C03B 5/2353

FOREIGN PATENT DOCUMENTS

EP           0281144 A2      9/1988
WO    WO-2016168443 A1 * 10/2016   ............. C03B 5/235
WO        2017/112671 A1     6/2017

* cited by examiner

*Primary Examiner* — Steven B McAllister
*Assistant Examiner* — Benjamin W Johnson
(74) *Attorney, Agent, or Firm* — Andrew G. Melick

(57) ABSTRACT

A combustion method in which heated flue gas heats a regenerator through which a mixture of fuel and flue gas is then passed to undergo endothermic reactions that produce syngas which is fed into a furnace together with a motive gas stream, wherein fuel is combusted with the motive gas stream to provide heat in alternate cycles.

19 Claims, 8 Drawing Sheets

(51) Int. Cl.
    *C03B 5/237*     (2006.01)
    *F23C 9/00*     (2006.01)
    *F23L 7/00*     (2006.01)
    *F23L 15/02*     (2006.01)
    *C10J 3/72*     (2006.01)
    *F23D 14/02*     (2006.01)
    *F23D 14/46*     (2006.01)
    *F23D 14/64*     (2006.01)
    *F23D 14/66*     (2006.01)
    *F27D 7/02*     (2006.01)

(52) U.S. Cl.
    CPC ................ *F23C 9/00* (2013.01); *F23L 7/007* (2013.01); *F23L 15/02* (2013.01); *C03B 5/235* (2013.01); *C10J 3/72* (2013.01); *C10J 2300/1606* (2013.01); *F23C 2202/20* (2013.01); *F23C 2900/06041* (2013.01); *F23C 2900/99011* (2013.01); *F23D 14/02* (2013.01); *F23D 14/46* (2013.01); *F23D 14/64* (2013.01); *F23D 14/66* (2013.01); *F27D 7/02* (2013.01); *F27D 2017/007* (2013.01); *Y02E 20/32* (2013.01); *Y02P 40/50* (2015.11)

(58) Field of Classification Search
    CPC ........ F23C 2202/20; F23C 2900/06041; F23C 2900/99011; F23D 14/02; F23D 14/46; F23D 14/64; F23D 14/66; F23L 7/007; F23L 15/02; F27D 7/02; F27D 17/004; F27D 2017/007; Y02E 20/32; Y02P 40/50
    USPC .......................................... 431/11
    See application file for complete search history.

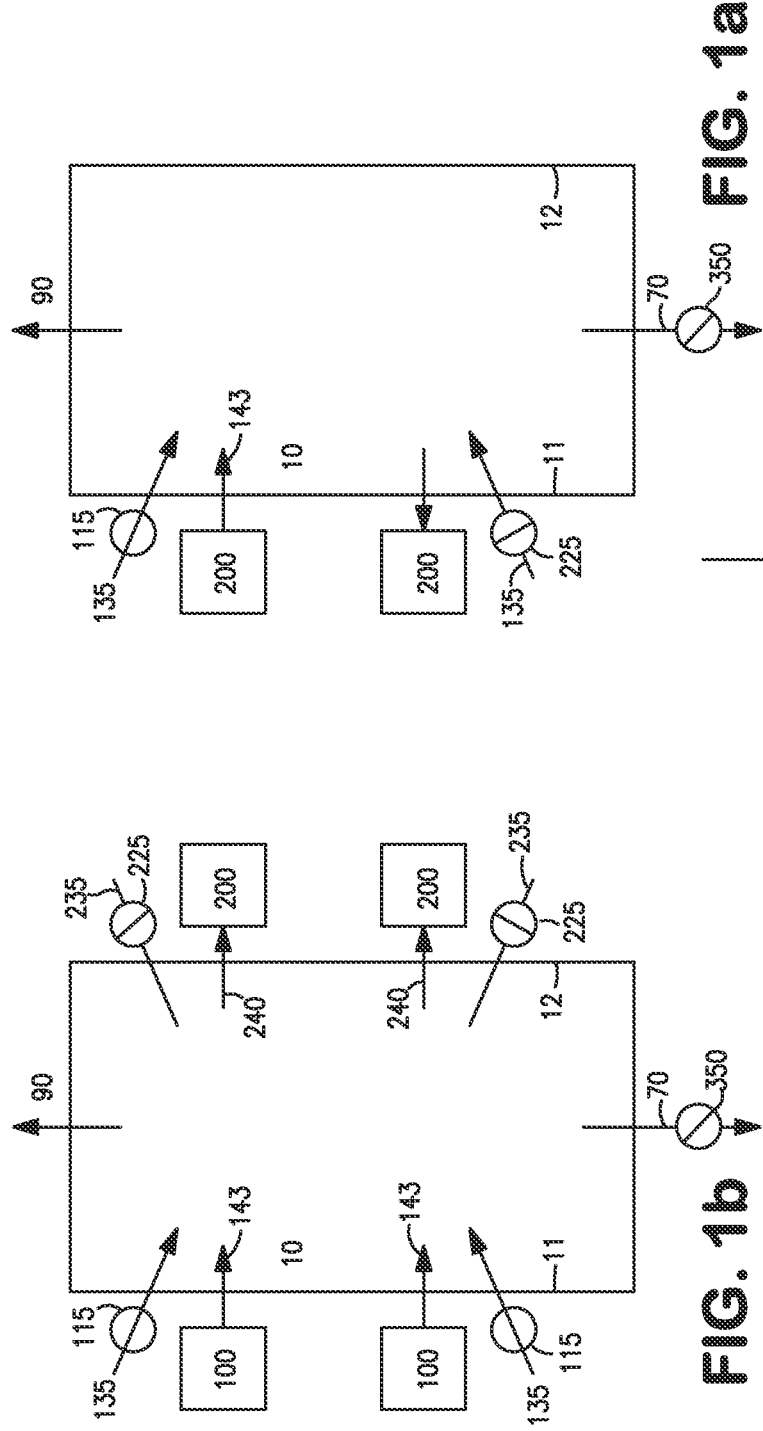
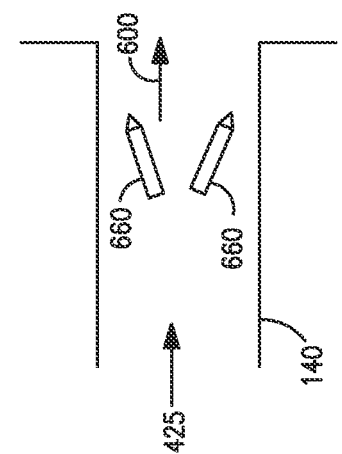
FIG. 1a
FIG. 4a
FIG. 1b

ENHANCEMENT OF THERMOCHEMICAL REGENERATION OPERATION

RELATED APPLICATIONS

This application is a U.S. national stage application of PCT International Application No. PCT/US20/28177 filed on Apr. 15, 2020, which claims the benefit of U.S. Provisional Application Ser. No. 62/850,079 filed on May 20, 2019, which is incorporated herein by reference.

FIELD OF THE INVENTION

The present invention relates to combustion methods in which at least one of the reactants for combustion is introduced at a low velocity into furnaces such as glassmelting furnaces, wherein material is fed into the furnace to be heated and/or melted by the heat of combustion that occurs within the furnace.

BACKGROUND OF THE INVENTION

A useful technology known as thermochemical regeneration (TCR) for utilizing the heat in flue gases that are produced in furnaces such as glassmelting furnaces is described in U.S. Pat. No. 6,113,874. In this technology, flue gas is passed through a regenerator which is heated by the flue gas. A portion of the flue gas that emerges from this regenerator is mixed with gaseous fuel and the resulting mixture is fed into another regenerator which has been heated sufficiently so that the mixture is converted into syngas by virtue of an endothermic reaction of components in the mixture. The resulting syngas is then fed from the regenerator in which it formed, into the furnace to be combusted. At appropriate intervals, the regenerators in which the operations are performed are reversed.

Whereas this technology has in general many attractive features, the present inventors have unexpectedly found ways to improve the efficiency of this technology.

BRIEF SUMMARY OF THE INVENTION

Thus, one aspect of the present invention is a method of carrying out combustion in a furnace, comprising
(A) combusting fuel in a furnace to produce gaseous combustion products; and
(B) carrying out the following sequence of steps (1) through (4):
   (1) (i) passing a portion of the gaseous combustion products into and through a cooled first regenerator to heat the first regenerator and cool said portion of the gaseous combustion products,
   (ii) passing at least part of said cooled portion of gaseous combustion products from said first regenerator, and gaseous fuel, into a heated second regenerator and, in the second regenerator, reacting the gaseous combustion products and the gaseous fuel in an endothermic reaction in the second regenerator to form syngas comprising hydrogen and CO,
   (iii) passing said syngas formed in the second regenerator at a velocity less than 50 feet per second into a first duct having an outlet that is connected to the interior of the furnace,
   (iv) injecting at least one stream of motive gas having a velocity of at least 100 feet per second from a first nozzle in the first duct into the syngas in the first duct upstream from the interior of the furnace, thereby entraining the syngas into the motive gas stream in the first duct and forming in the first duct a mixed stream comprising a mixture of the syngas and the motive gas and having a velocity greater than 50 feet per second, and
   (v) passing said mixed stream at a velocity of greater than 50 feet per second from said first duct into said furnace and combusting the mixed stream with one or more oxidant streams injected into said furnace; and then
   (2) (i) discontinuing the passage of gaseous fuel into the second regenerator, continuing to pass cooled gaseous combustion products into and through said second regenerator thereby removing fuel and syngas from the second regenerator and lowering the concentration of fuel and syngas in the second regenerator, feeding fuel and gaseous oxidant out of the first nozzle in the first duct and combusting them to generate heat of combustion which heats the interior of the furnace, and thereafter discontinuing the injection of said gaseous oxidant from said first nozzle in the first duct, so that only fuel is being passed out of the first nozzle, and combusting said fuel with said one or more oxidant streams injected into said furnace; and thereafter (ii) discontinuing the flow of fuel out of the first nozzle into the first duct, and discontinuing combustion of fuel out of said first nozzle, and discontinuing passage of gaseous combustion products from the furnace through the first regenerator; and then
   (3) (i) passing a portion of the gaseous combustion products into and through a cooled second regenerator to heat the second regenerator and cool said portion of the gaseous combustion products,
   (ii) passing at least part of said cooled portion of gaseous combustion products from said second regenerator, and gaseous fuel, into a first second regenerator and, in the first regenerator, reacting the gaseous combustion products and the gaseous fuel in an endothermic reaction in the first regenerator to form syngas comprising hydrogen and CO,
   (iii) passing said syngas formed in the first regenerator at a velocity less than 50 feet per second into a second duct having an outlet that is connected to the interior of the furnace,
   (iv) injecting at least one stream of motive gas having a velocity of at least 100 feet per second from a second nozzle in the second duct into the syngas in the second duct upstream from the interior of the furnace, thereby entraining the syngas into the motive gas stream in the second duct and forming in the second duct a mixed stream comprising a mixture of the syngas and the motive gas and having a velocity greater than 50 feet per second, and
   (v) passing said mixed stream at a velocity of greater than 50 feet per second from said second duct into said furnace and combusting the mixed stream with one or more oxidant streams injected into said furnace; and then
   (4) (i) discontinuing the passage of gaseous fuel into the first regenerator, continuing to pass cooled gaseous combustion products into and through said first regenerator thereby removing fuel and syngas from the first regenerator and lowering the concentration of fuel and syngas in the first regenerator, feeding fuel and gaseous oxidant out of the second nozzle in the second duct and combusting them to generate heat of combustion which heats the interior of the furnace, and thereafter discontinuing the injection of said gaseous oxidant from said second nozzle in the second duct, so that only fuel is being passed out of the second nozzle, and combusting said fuel with said one or more oxidant streams injected into said furnace; and thereafter (ii) discontinuing the flow of fuel out of the second nozzle into the second duct, and discontinuing combustion of fuel out of said second nozzle, and discontinuing passage of gaseous combustion products from the furnace through the second regenerator; and thereafter (C) repeating step (B) at least once.

The preferred conditions for carrying out the methods of this invention include the following:

The total momentum of said motive gas is greater than five times the momentum of the mixture of recycled flue gas and fuel gas which is reformed in the regenerator;

The mass flow rate of the motive gas injected into the fuel gas is less than 30% of the mass flow rate of the fuel gas into which the motive gas is injected;

The mass flow rate of the motive gas injected into the fuel gas is greater than 5% and less than 20% of the mass flow rate of the fuel gas into which the motive gas is injected, The motive gas is injected into the fuel gas from a nozzle having an internal diameter D in the duct at an upstream distance L from the interior wall of the furnace under conditions such that the value of (L/D)×(N/R) is from 4 to 25, wherein N is the number of streams of motive gas injected into the fuel gas in the duct and R is the ratio of the total mass flow rate of fuel gas passed into the duct to the total mass flow rate of the stream, or all of the streams, of motive gas injected into the duct, thereby entraining the fuel gas into the motive gas stream in the duct and forming in the duct at least one mixed stream comprising a mixture of the fuel gas and the motive gas and having a velocity greater than 50 feet per second;

The motive jet comprises oxygen, steam, recycle flue gas, or fuel gas;

At least two streams of motive gas are injected at a velocity of at least 200 feet per second in a diverging angle relative to each other in the horizontal direction into the fuel gas in the duct toward the said outlet and the mass flow rate of each stream of the motive gas injected into the fuel gas is less than 10% of the mass flow rate of the fuel gas into which the motive gas is injected;

Said furnace is a glass melting furnace having at least two ducts from which fuel gas is passed into the furnace, with each duct having an outlet that is connected to the interior of the furnace through a side wall of the furnace.

The invention includes preferred embodiments defined by reference to the relative momentum of the gas flows.

One is a method of carrying out combustion in a furnace equipped with thermochemical regenerators with a firing port through which heated syngas can enter the furnace, one or more oxidant ports through which oxidant can be injected into the furnace, and an exhaust port which is connected to the furnace and through which gaseous combustion products can exit from the furnace, comprising (i) flowing heated syngas through the firing port into the furnace at momentum F at a velocity less than 50 feet per second, (ii) injecting at least one stream of motive gas at momentum M having a velocity of at least 100 feet per second, inside the duct connected to the firing port to entrain said syngas into the motive gas stream and to project the resulting combined stream into the furnace, (iii) injecting one or more streams of oxidant at total momentum O through said one or more oxidant ports into the furnace wherein the axis of each stream of oxidant is placed between 3 inches to 30 inches from the interior perimeter of the firing port, and mixing the injected oxidant with the fuel stream that is entrained into the motive gas stream to form a visible flame projecting into the furnace without touching walls nor crown of the furnace, and (iv) exhausting gaseous combustion products from the furnace through the exhaust port at momentum X, wherein the combined momentum F+M+O is greater than 150% of the momentum X.

Another such embodiment is a method of carrying out combustion in a furnace equipped with thermochemical regenerators with a firing port through which heated syngas can enter the furnace, one or more oxidant ports through which oxidant can be injected into the furnace, and an exhaust port which is connected to the furnace and through which gaseous combustion products can exit from the furnace, comprising (i) flowing heated syngas through the firing port into the furnace at momentum F at a velocity less than 50 feet per second, (ii) injecting at least one stream of motive gas at momentum M having a velocity of at least 100 feet per second and one or more streams of oxidant into the furnace at total oxidant momentum O from points outside the firing port wherein the axis of each stream of motive gas and oxidant is placed between 3 inches to 30 inches from the interior perimeter of the firing port, and entraining surrounding furnace gas and syngas to form a visible flame projecting into the furnace without touching side walls nor crown of the furnace, and (iii) exhausting gaseous combustion products from the furnace through the exhaust port at momentum X, wherein the combined momentum F+M+0 is greater than 150% of the momentum X.

In these embodiments, the momentum values F, M, O and X should all be expressed in the same units, such as (pounds/hour) times (feet/second).

In the foregoing two embodiments, preferred conditions include:

The exhaust port is the inlet into a regenerator which is operating in the "flue cycle" as described herein, in which hot gaseous combustion products flow from the furnace into a regenerator to heat the regenerator.

The combined momentum F+M+O is greater than 300% of the momentum X;

The said momentum M is greater than the momentum X;

The momentum of each stream of said oxidant streams is greater than L;

Said motive gas comprises 5 to 20% of the total oxidant flow injected into said furnace;

Said streams of oxidant are injected at velocity greater than 100 ft/sec;

The density of said heated syngas entering said furnace through said firing port is less than the density of said gaseous combustion products exiting said furnace at said exhaust port;

At least two streams of motive gas are injected into said heated syngas in each firing port in a diverging angle relative to each other in the horizontal direction so as to form a horizontally wide visible flame;

Both said firing port and said exhaust port are angled to reduce direct radiation heat transfer from the furnace to the thermochemical regenerators.

Preferably, the oxygen content of the mixture of motive gas and fuel gas is less than the stoichiometric requirement for complete combustion of the fuel gas or syngas in the mixture, and one or more secondary streams of gaseous oxidant comprising oxygen is injected into the furnace to combust with the remainder of the fuel gas or syngas in the mixture.

BRIEF DESCRIPTION OF THE DRAWINGS

FIGS. 1, 1a, 1b, and 2-3 are schematic representations of different aspects of the present invention.

FIG. 4a is a top view of an alternate embodiment in which the invention can be implemented.

DETAILED DESCRIPTION OF THE INVENTION

Figure 1:
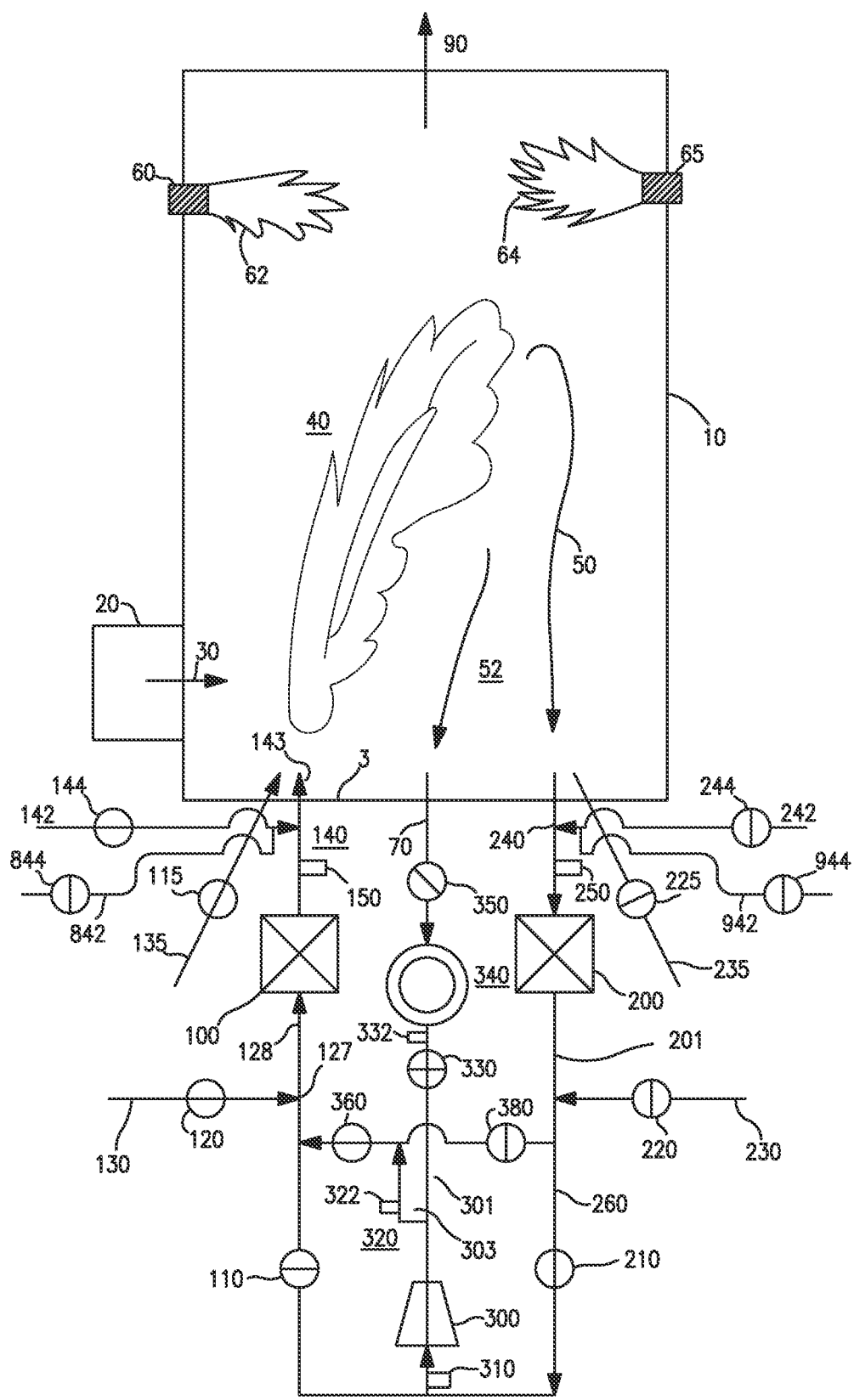

The following description will describe first the overall thermochemical regeneration apparatus and method, and then the implementation of the motive gas and the implementation of combustion, at the location of the motive gas, during the purging of a regenerator between each cycle of the thermochemical regeneration.

The present invention is generally applicable for a combustion process in which either fuel or oxidant enters a furnace with a low velocity (by which is meant that one or both fuel and oxidant may enter a furnace with low velocities). The motive gas stream described herein, and the use of the motive gas stream to entrain fuel gas such as syngas, provide useful advantages with any furnace having the fuel stream or the oxidant stream injected at low velocity.

The invention is described herein in particular detail with respect to a preferred type of furnace, namely one that employs a heat recovery process which recaptures usable heat from high temperature flue gas exhaust streams. This heat recovery process proceeds in two cycles, which are referred to herein as the flue cycle and the reforming cycle. These two cycles are performed alternatingly in two or more checker-filled regenerators. The heat recovery process is preferably carried out in association with furnaces and other combustion devices which employ "oxy-fuel" combustion processes, i.e. combustion of fuel with gaseous oxidant comprising an oxygen content of at least 50 vol. % oxygen, and preferably at least 75 or 80 vol. % oxygen, more preferably at least 90 vol. % oxygen, and even at least 99 vol. % oxygen, because the flue gases produced by oxy-fuel combustion have higher H2O and CO2 concentrations, both of which promote the endothermic reforming reactions that are utilized in the method of this invention. During the flue cycle, the checkers in a first regenerator extract and store heat from a high temperature flue gas which is fed from the furnace into and through this regenerator. Then, in the reforming cycle, from the cooled flue gas that exits the first regenerator, a portion (which is referred to herein as Recycled Flue Gas or RFG) is fed into another (second) regenerator and mixed with a stream of fuel (referred to herein as Reforming Fuel or RF). In the following description, pure methane (CH4) is described as reforming fuel for purposes of illustration. Other satisfactory fuels include any combustible gas, gas mixture, or vaporized liquid fuels including, but not limited to, natural gas, propane, and LPG (liquefied petroleum gas).

In the reforming cycle, the RFG/Reforming Fuel mixture enters the second regenerator in which the checker has already been heated, as described herein, and flows through it towards the furnace. The temperature of the RFG/RF mixture passing through the second regenerator continues to increase by extracting heat from the already pre-heated checker. Some of the fuel may crack endothermically upon heating as it passes through the checker and form H2, other hydrocarbons and soot. As the RGF/RF mixture passes through the second regenerator, it reaches a temperature at which reforming reactions begin to occur and continue to occur, producing products including H2 and CO. The reforming reactions are endothermic and the heat needed to promote the reforming reactions is absorbed from the heated checker. The gaseous composition that is produced by the reforming reactions typically comprises one or more components such as such as H2, CO, unreacted gases comprising H2O, CO2, CH4, other hydrocarbons and soot. The gaseous composition thus produced may also be called "syngas" herein. The syngas emerges from the second regenerator into the furnace and is combusted in the furnace with oxidant to provide thermal energy for heating and/or melting material in the furnace.

After a length of time, the operation of the two regenerators is reversed, i.e., the regenerator that was used in the flue cycle is switched to the reforming cycle, and the regenerator that was used in the reforming cycle is switched to the flue cycle. After a further period of time, the operation of the two regenerators is reversed again. The timing of the reversals can be determined by elapsed time, or by other criteria such as the temperature of the flue gas exiting from the first regenerator that is in flue cycle.

The reversal process is carried out according to a predetermined mechanism and plan, wherein valves are sequenced to open and close based on specific timings, to provide purging of the interior of the regenerator that had been used to generate syngas. During the purging step, fuel is fed and combusted at the exit of that regenerator (as described in more detail below), to provide heat to the contents of the furnace that helps to replace the heat from the combustion of the syngas that is no longer flowing out of that regenerator.

The operation and control of the present invention is described below first in conjunction with FIGS. 1 to 3. An end-port fired glass furnace (10) fitted with two regenerators in end wall (3) is used as an example. However, the operation described herein of a pair of regenerators can be carried out in the same manner when the pairs of regenerators are side by side on one side of furnace (10) as shown in FIG. 1a or are positioned on both opposite sides of furnace (10) as shown in FIG. 1b. When regenerators are on facing sides of a furnace, their respective ports through which alternatingly gaseous combustion products exit the furnace and syngas (fuel gas) enters the furnace, lie on an axis that is perpendicular to the longitudinal axis of the furnace.

As shown in FIGS. 1, 1a, and 1b, end-port glass furnace (10) has side walls (11) and (12) and a feed station (20) where feed material (30) comprising solid glassmaking materials (known as batch and/or cullet) are charged into the furnace to be heated and melted. The flow of molten glass out of furnace (10) is represented as (90). The furnace (10) is equipped with first regenerator (100) on the furnace left side and second regenerator (200) on the furnace right side. Vertical cross-sectional views of the two regenerators are displayed in more detail in FIGS. 2 and 3. Pairs of regenerators (100) and (200) that are positioned as shown in FIG. 1a or 1b are connected to each other, and are operated, as described below with reference to FIGS. 1-3, 4-4a, 5-5a, 6-7, and 7a-7c.

Figure 2:
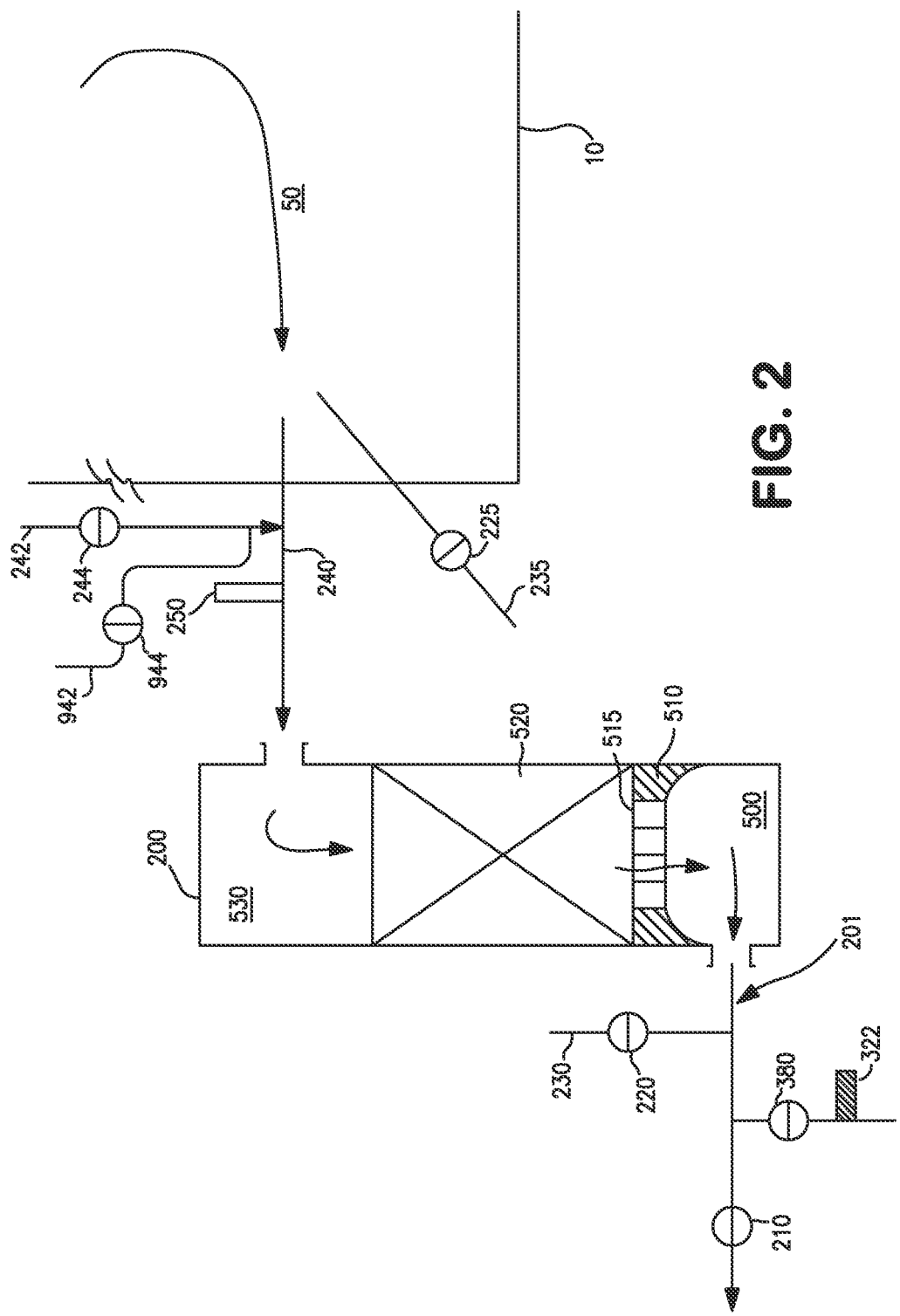

As seen in FIG. 1 and FIG. 2, regenerator (200) is in the flue cycle wherein flue gas stream (50) from the interior of furnace (10) enters port neck (240) and then flows to the top space (530) of regenerator (200) past an oxygen analyzer (250). The flue gas stream heats checkers (represented as (520)) as it flows through passages between the checkers within regenerator (200), and enters chamber bottom space (500) through gas passages (515) supported on arch (510) which also supports the weight of the whole bed of checkers. As seen in FIG. 1, a portion (52) of the flue gases produced in furnace (10) may be by-passed to conduit (70) through a partially opened valve (350) then enters stack (340) to exhaust, by which is meant that it does not re-enter the furnace but instead is discharged to the atmosphere and/or conveyed to one or more other stations for storage and/or further treatment or any combination of such destinations. For maximum heat recovery, it is preferred that valve (350) is closed so that essentially all the furnace flue gas goes to regenerator (200) as flue gas stream (50).

As seen in FIGS. 1 and 2, the cooled flue gas stream (201) exits the regenerator (200) in conduit (260), passes through an open valve (210) and oxygen sensor (310), and then enters the suction-side of blower (300). The majority of the flue gas (301) leaving the pressure-side of the blower passes through a damper (330) then a flow meter (332), and finally is directed into stack (340) through which this flue gas leaves the system to exhaust as defined herein. A portion (303) of the flue gas is recycled to the bottom of regenerator (100) by passing through conduit (320) and valve (360). This is Recycled Flue Gas (RFG). Its flow is metered by a flow meter (322). Reforming fuel which is to be fed to the second regenerator (100) is supplied by a conduit (130) through valve (120).

Figure 3:
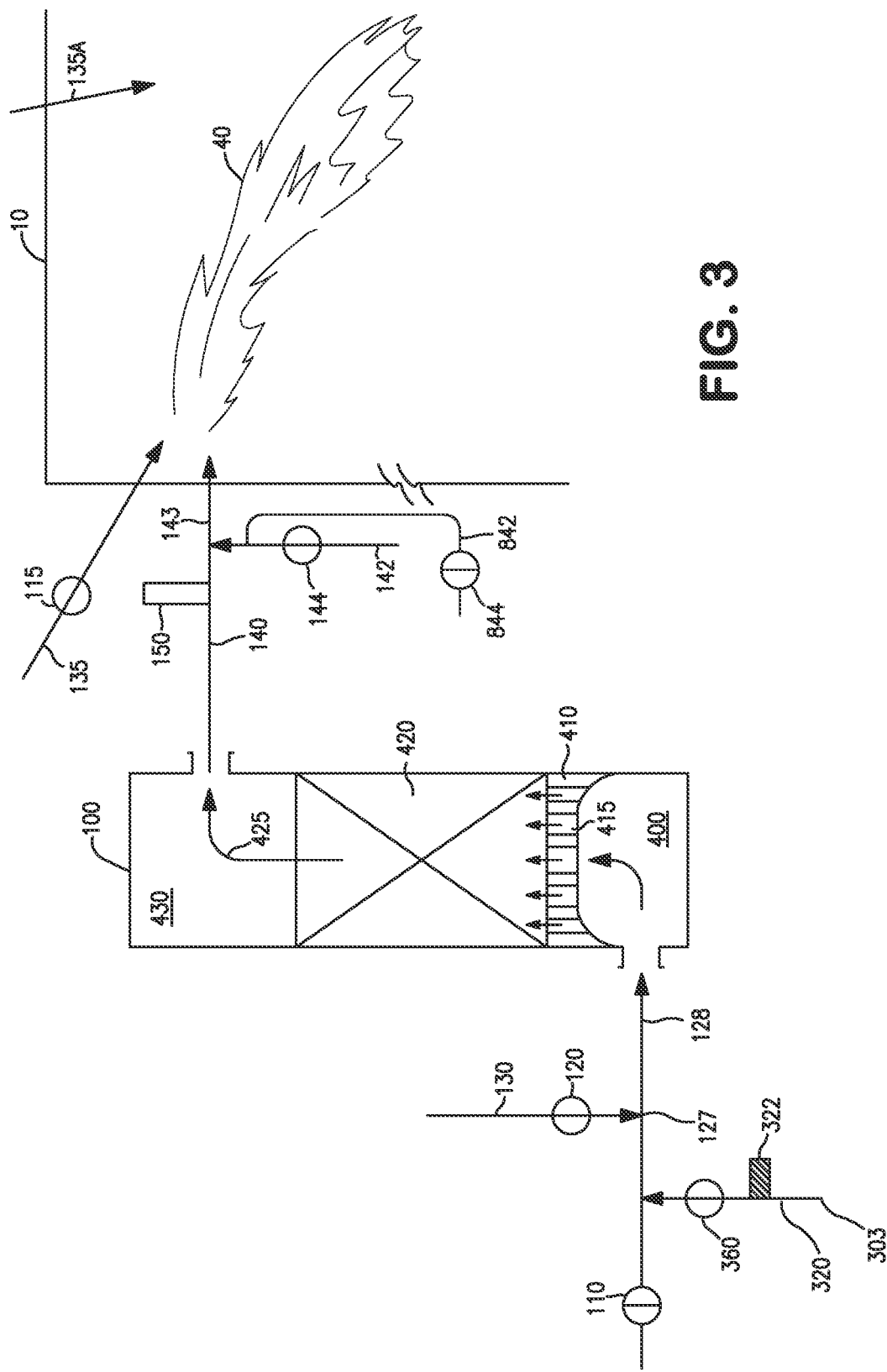

As seen in FIG. 1 and better in FIG. 3, the reforming fuel (RF) from stream (130) intersects and mixes with the RFG (303) at location (127) in conduit (128) which also communicates with the bottom space (400) of regenerator (100). This RFG/RF mixture enters the already pre-heated checker pack (420) of regenerator (100) through gas passages (415) on arch (410). Regenerator (100) has already been heated in a previous cycle by passage of flue gas from the furnace into and through the regenerator (100). The temperature of the RFG/RF mixture increases as it flows through the checker pack of regenerator (100). Some of the fuel may crack endothermically upon heating as it passes through the checker and form H2, other hydrocarbons and soot. When the temperature of the RFG/RF reaches reforming temperature, endothermic reforming reactions occur in which the reforming fuel (e.g. CH4) reacts with CO2 and H2O in the RFG and forms CO, H2, and some soot. The required heat for the endothermic reforming reactions is taken from the heated checkers. The reforming reaction continues as the RFG/RF mixture continues to travel toward the top space (430). The gaseous stream (425) (referred to herein as a "reformed" or "syngas" gas stream) exits from the top of checker pack (420). Stream (425) has high temperature and includes species such as CO, H2, soot, unreacted CH4, and unreacted CO2 and H2O. The syngas stream (425) passes through port neck (140) and oxygen sensor (150), and enters furnace (10). The syngas stream exits checker pack (420) at temperatures for example ranging from 1800 F to 2500 F.

Motive gas stream (142), represented in FIG. 3 and described more fully below, passes through open valve (144) and is mixed into stream (425) from regenerator (100). Fuel stream (842) is also located to be provided at this location, when valve (844) is open during a purging step as described below. The resulting mixed stream (143) of syngas and motive gas passes into furnace (10) and is combusted in furnace (10) to generate additional heat of combustion useful for heating and/or melting material in the furnace, such as glassmaking materials. Oxidant for combustion of the syngas is supplied by a conduit (135) with an opened valve (115). This oxidant can be air, or it can have an oxygen content higher than that of air, i.e. at least 21 vol. %, and preferably equal to or higher than 75 or 80 vol. %, more preferably equal to or higher than 90 vol. %, or even at least 99 vol. %. Another such motive gas stream (242) controlled by valve (244) is provided for use with regenerator (200) as shown in FIG. 2, when regenerator (200) is in the cycle of producing syngas. Fuel stream (942) is located to provide fuel to this location, when valve (944) is open, as described below.

Typically, the heat recovery process proceeds with one regenerator in the flue cycle and one regenerator in the reforming cycle, as seen in FIG. 1, for about 20 to 40 minutes or until the checkers in the reforming regenerator are too cold to provide sufficient heat to promote the desired endothermic chemical reactions. At that point, and now continuing with the description herein where regenerator (200) was in the flue cycle and regenerator (100) was in the reforming cycle, furnace (10) undergoes reversal in which regenerator (200) is transitioned to the reforming cycle for heat recovery and regenerator (100) is transitioned into the flue cycle for heat accumulation.

Figure 8:
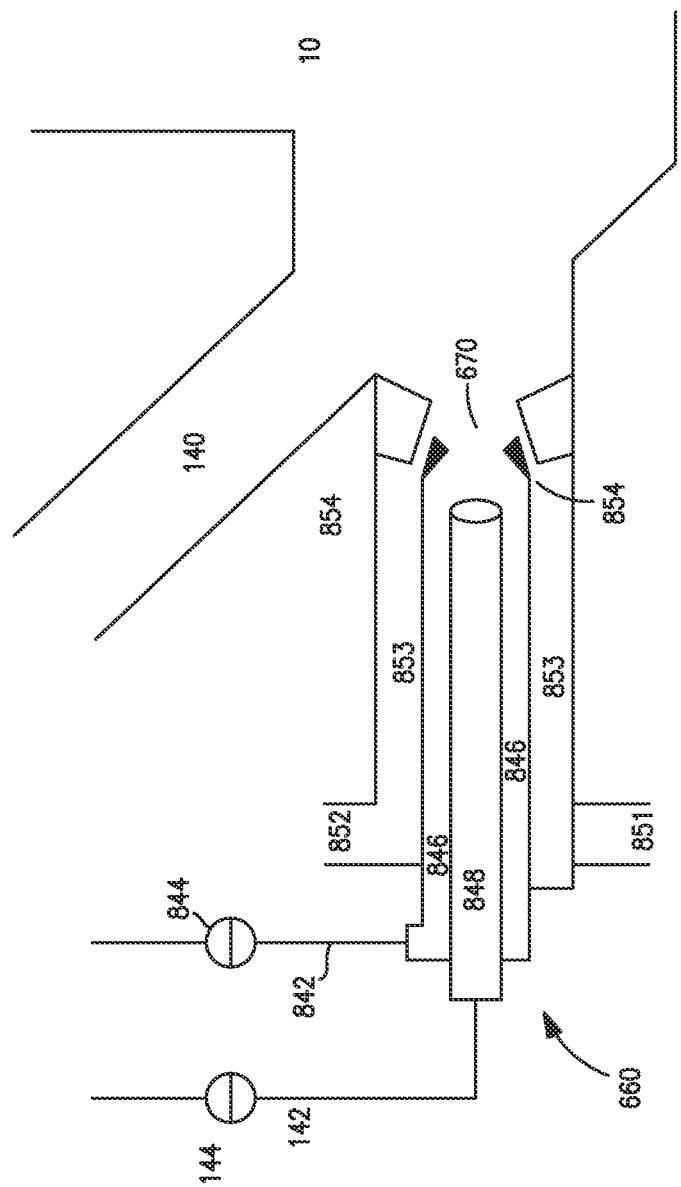
FIG. 8 is a side cross-sectional view of a duct including a lance useful with this invention.

Before the reversal, remaining syngas in regenerator (100) is to be purged to furnace (10). In this instance, reforming fuel supply to the regenerator is terminated by closing valve (120) while letting the flow of RFG from the other regenerator into the regenerator being purged continue, such as via blower (300). Valve (844) is opened so that fuel gas (842) (such as natural gas, methane, or any other combustible gaseous hydrocarbon product or composition) flows to the nozzle from which the motive gas was injected. Beginning typically 10 to 20 seconds after the termination of flow of reforming fuel to the regenerator being purged, fuel gas is flowed from (842) through nozzle (670) (which is seen in FIG. 8) so that for a period typically of about 10 to 25 seconds fuel gas and oxidant motive gas are both flowing out of the nozzle (670). A period of time typically about 30 to 45 seconds after the termination of the flow of reforming gas to the regenerator, the flow of oxidant motive gas is terminated by closing valve (144); fuel gas continues to flow out of nozzle (670) and is combusted in furnace (10) with oxidant that is fed into the furnace. The flow of fuel gas does not necessarily impart motive force to the gas that is flowing at this point in time through the regenerator that is being purged. The flow of fuel gas is typically continued up to typically about 120 seconds after termination of the flow of reforming fuel was terminated. The fuel gas (842) is combusted at the nozzle, to provide heat to the charge that is in furnace (10). Throughout these purging steps, recycled flue gas continues to flow (typically at about double the previous flow rate) through the regenerator (100) to purge remaining syngas and residual fuel gas from this regenerator, into furnace (10). Remaining syngas in regenerator (100) is purged by the RFG for a specified amount of time so that nearly all the syngas in the regenerator is expelled to the furnace and combusted to completion.

The combustion of fuel gas at the nozzle from which motive gas passes provides heat to the furnace even during the purging in which syngas is not being produced in the regenerator that is being purged. In addition, the combustion at the motive gas nozzle can be used to supplement and even to replace combustion of syngas from the regenerator, for instance at times when the TCR operation is shut down for maintenance or other reasons.

Then, after the regenerator has been sufficiently purged of syngas, the combustion of the fuel from (842) is stopped by closing valve (844), the flow of oxygen from the motive gas lance is stopped, stage oxidant flow is stopped, and valve positions are reversed so that RFG and fuel are fed to regenerator (200) to make syngas therein, and flue gas is flowed through regenerator (100) to heat it. Preferably, at the point in time that valve positions are to be switched so as to reverse the functions of the two regenerators, the flows of fuel and oxidant gas are stopped for about 10 seconds to allow time for the affected valves to actuate and change positions.

Upon reversal following the purging, the flue gas from the furnace passes through regenerator (100), and a portion thereof passes to exhaust (as defined herein) while a portion or the balance is mixed with fuel and the mixture is passed through regenerator (200) and into the furnace. Valve (110) which had been closed is opened, valve (210) is closed, and valve (360) is closed and valve (380) is opened, to permit heated flue gas to pass from regenerator (100) toward and through blower (300), and to permit a portion (303) of this flue gas to pass into regenerator (200) after it is mixed with reforming fuel (230) which enters through valve (220) which had been closed but now is opened. Valve (115) which had been open is closed, as no combustion aided by oxidant through valve (115) occurs in this phase, and valve (225) is opened. The resulting mixture of reforming fuel and recycled flue gas undergoes in regenerator (200) the endothermic reactions which had occurred in regenerator (100) in the previous cycle as described herein, to produce syngas (425) which passes into furnace (10) where it is combusted with oxidant (235) that is fed through valve (225).

Upon the reversal, valve (144) is also closed and valve (244) is opened, so that motive gas stream (242) mixes with syngas emerging from regenerator (200) and the resulting mixture enters furnace (10) for combustion. Then, when production of syngas in regenerator (200) has proceeded sufficiently, the cycles are reversed again, but only after regenerator (200) is purged of syngas in the manner analogous to how regenerator (100) had been purged prior to the cycle that is now ending.

During the heat recovery process, furnace (10) may be co-fired with other burners such as (60) and (65) such that both syngas flame (40) and burner flames (62) and (64) co-exist. In addition, burners (60) and (65) may or may not be firing during the reversal process when the reforming regenerator (100) or (200) as the case may be is undergoing the purging sequence described above. For maximum heat recovery, it is preferred that burners (60) and (65) are not co-firing with the syngas flame (40). It is also preferred that during the purging sequence, burners (60) and (65) are not firing.

The motive jet in the present invention employs two different general approaches to prevent the uncontrolled fuel flowing condition (i.e., uncontrolled flame shape) which has been recognized as being caused by the very low velocity of hot syngas entering the furnace through the TCR port. The first approach is to transform the low velocity syngas into a well-defined higher velocity gas stream using a motive gas within the syngas stream. The second approach is to place a sufficient number of high velocity jets around the syngas port to entrain syngas into multiple oxidant jets together with surrounding furnace gas to control both the flame shape and the flame temperature. Furthermore the method can form a long oxy-fuel flame projecting from the firing wall toward the opposite wall of the furnace for the low velocity syngas fuel stream issuing from a firing port located in the firing wall. In the following sections these aspects of the present invention are described in detail.

Turning to the implementation of the motive gas stream in this invention, it can be employed (especially with oxy-fuel combustion) to produce a well-contoured flame with a low peak flame temperature in a furnace or other combustion chamber from a low velocity stream of fuel or oxygen of less than 50 ft/sec and more preferably less than 25 ft/sec wherein at least one high momentum motive gas stream (142) with a low mass flow rate is introduced into the low velocity stream in the gas supply passages (ducts) (alternately, (140) and (240)) connected to a furnace to form a higher velocity mixed stream in the direction of port exit (143) which is fed into the furnace. The velocity of the motive gas stream should be at least 100 ft/sec and is preferably at least 400 ft/sec, more preferably at least 800 ft/sec. The mixed streams as they enter the furnace, after mixing, have gas velocities greater than 50 ft/sec and more preferably greater than 100 ft/sec.

This invention is particularly useful when either the fuel or the oxygen stream into which the motive gas stream is fed has a low gas density and a velocity in the passage of less than 30 ft/sec or even less than 15 ft/sec. With this invention, it has been discovered that the risk of the flame (formed by combustion of the syngas or other fuel gas) lofting or rising toward the crown of the furnace is avoided, which avoids the risk of damage to the crown because of the very high flame temperature. Indeed, the invention is particularly useful where the density of the fuel gas or syngas which is entrained into the motive gas as described herein, is lower than the density of the gaseous combustion products formed by the combustion in the furnace.

The injection points of the mixed stream, and of any secondary streams such as oxidant, entering the furnace may be spaced apart to prevent rapid local mixing which could form a high temperature flame with high NOx emissions. The velocity of the mixed stream is defined as the average velocity of the motive gas stream and of the original low velocity stream into which the motive gas stream is fed. When two or more motive gas streams are employed, it is preferred that at least one of the streams entering the furnace has a velocity greater than 100 ft/sec, and preferably all streams have gas velocities greater than 100 ft/sec. The total mass flow rate of all motive gas streams is less than 60%, preferably less than 30%, and most preferably less than 20%, or even 15%, of the mass flow rate of the low velocity fuel stream into which the motive gas is fed. Preferably each motive gas stream is composed of fuel or oxidant that is combusted in the furnace. The motive gas most preferably comprises oxygen to be combusted in the furnace. It is especially preferable for the motive gas stream to comprise at least 75 vol. % oxygen and preferably at least 90 vol. % oxygen, especially in use with combustion of syngas from the thermo-chemical regenerator methods described herein. In another preferred aspect, the mass flow rate of the motive gas injected into the fuel gas or syngas provides between 10% (or even 5%) to 35%, preferably between 10% to 25% (or even 10% to 20%), of the stoichiometric mass flow rate of oxygen required for complete combustion of the fuel gas or syngas into which the motive gas is injected.

For use of the invention in a furnace using thermochemical regenerator, the motive gas stream is preferably comprised of a portion (that is, less than 100% of the stoichiometric requirement) of the oxidant used for combustion of the fuel that is in the stream into which the motive gas stream is fed. Any other gases such as compressed RFG, steam, fuel gas and air can be used as the motive gas. The motive gas stream comprising this portion of the combustion oxidant is supplied through a nozzle or multiple nozzles installed inside the fuel supply duct through which the low-velocity fuel stream passes from the regenerator to the furnace. This motive gas stream, comprising the portion of the combustion oxidant, is at high velocity with very high momentum produced by use of suitable injection nozzles. The high momentum of the motive gas stream not only entrains, mixes, and combusts part of the surrounding low velocity fuel, but also entrains, propels and directs the remaining un-combusted low velocity fuel into the combustion enclosure (furnace) towards desired locations through momentum exchange between the fuel and the motive gas stream. At least 50 vol. %, preferably at least 70 vol. % and more preferably at least 90 vol. % of the fuel gas or syngas is entrained into the motive gas stream in the low velocity fuel gas duct before entering the furnace, forming the mixed stream that passes into the furnace. The ratio of the mass flow rate of fuel gas entrained to the mass flow rate of the motive gas injected is approximately proportional to the ratio of the recess distance L and the diameter D of the nozzle end through which the motive gas stream is fed into the duct, that is, L divided by D, wherein the recess distance L is defined as the distance between the injection point into the duct (at the end of nozzle (670)) to the duct exit to the furnace, i.e., to the inner surface of the furnace interior where the duct ends (L is the space shown as (690) in FIG. 5). Thus, the preferred range of L/D that provides a desired amount of syngas entrainment into the motive gas stream can be defined for any given apparatus by conducting tests with the specific geometries of the fuel supply duct and the motive gas nozzle, using the relationships described herein.

A stream of secondary oxidant (also referred to herein as "$2^{nd}$ oxidant") can be introduced into the combustion enclosure from one or more injection points spaced apart from the duct that carries the mixed stream, for completing combustion of the remaining fuel which has been propelled into the furnace in the mixed stream. Preferably the secondary oxygen is injected from two to four injection points below the center line of the syngas duct. More preferably the secondary oxygen is injected from two to four injection points below the syngas duct so as to maintain an oxidizing atmosphere in at least the portion of the atmosphere within the lower part of the furnace that is in contact with material contained in the furnace.

In this combustion process for low velocity fuels, the momentums of the motive gas stream and of any secondary oxidant streams are much larger than the momentum of the stream into which the motive gas is fed. Therefore, flow field characteristics in the furnaces (such as flow directions, velocity magnitudes, and the location of the flow recirculation zones) are strongly influenced and mostly determined by the directions (i.e., vector angles) and the magnitude of the momentums designed for these two oxidant streams. This additional capability of being able to alter or modify furnace flow characteristics during the said combustion process is particularly advantageous for achieving optimized thermal performance and a desired temperature distribution in the furnace. Additional advantages include reduced NOx emissions, reduced particulate carry-over into the flue gas, and increased energy utilization efficiency in a glass furnace, and the ability to adjust the redox state (i.e. more oxidizing or less oxidizing, more reducing or less reducing) of the gaseous atmosphere near the molten glassmaking materials or other materials in the furnace. Thus, this aspect of the present invention permits establishing an oxidizing atmosphere over the charge in the furnace, which is often an aid in improving the properties of the product being produced.

Since the motive gas stream is to entrain and propel the low-velocity fuel stream into the combustion enclosure prior to forming a main flame in the furnace, the location at which the motive gas stream is fed into the duct to mix with the low-velocity stream, is recessed into the duct away from the hot interior walls of the furnace itself, so as to entrain most of the low velocity fuel stream and to limit or minimize entrainment of furnace flue gases into the duct.

The combustion method of the present invention can also be implemented to influence the overall flow patterns in the furnace so that optimum furnace thermal performance is achieved. This is different from burners which use a high velocity jet to entrain a low velocity jet for combustion purposes only but not to significantly influence the overall furnace flow patterns. For example and in glass furnace applications, the motive gas stream and the $2^{nd}$ oxidant stream in the practice of this invention can be designed so that preferred furnace flow fields are obtained in order to avoid overheating of furnace refractory walls or crown, and to have low local gas velocities near the glass surfaces to minimize alkali volatilization. This method of controlling the overall furnace flow field is further described in more details below.

By using a motive gas stream with a high velocity and a low mass flow rate dilution of fuel or oxygen stream is minimized when non-combustion gases (N2, CO2, steam, recycled flue gas, etc) are used. Since injection of non-combustion gases into the furnace would reduce the furnace energy efficiency, minimizing the mass flow rate of motive gas stream is particularly important. When a small flow rate of combustible gas is used (e.g., the motive gas is fuel fed into an oxygen stream or is a motive gas stream of oxygen or air fed into a fuel stream), the heat generated by reaction within the gas passage is small and prevents overheating of the gas passage. It is an important consideration when the low velocity stream is at high temperature as is the case for the preheated fuel stream in thermochemical regenerator (TCR) operation.

In a thermochemical regenerative waste heat recovery system for glass furnaces, both flue gas exhaust and preheated fuel gas supply share the same duct passage (i.e., regenerator port neck) alternately. This means the duct size is common for both uses. The flue gas velocity at the port entrance is typically designed in the range of 20 ft/sec up to 50 feet per second or even up to 60 ft/sec to prevent batch particle carry over and to facilitate a uniform flow distribution over a large cross-sectional area of the checker pack in the regenerator. The flue gas velocity is also restricted by the power of the exhaust blower, and by wear conditions resulting from high velocity at the internal surfaces of the refractory lined high temperature duct. As the fuel gas volumetric flow rate from TCR is substantially less than the flue gas flow rate from the furnace, the fuel gas has a resulting lower velocity through the shared duct. The present invention improves the discharge velocity of the lower velocity fuel gas stream into the combustion space, by imparting a higher momentum and higher velocity vector to the fuel gas stream in combination with the motive gas stream comprising oxidant. This is important for carrying out efficient combustion where the momentum of the fuel gas without the motive gas jet at the entrance to the combustion space is too low to maintain its own flow direction. Without the increased momentum and velocity vector, the fuel gas will follow the natural circulation pattern of the existing convection cells within the combustion space, directing the fuel gas to contact wall and crown refractory surfaces in high concentration, prior to mixing with the oxidant for combustion. This condition is highly undesirable and can result in refractory damage, local overheating, unburned fuel escaping through the flue exit, and poor heat distribution to the process charge. The motive gas feature of the present invention solves all these undesirable conditions by imparting both momentum and direction to the fuel gas stream as it enters the combustion space, allowing the resulting mixture to be directed in a way that completes combustion within the available volume, and providing a favorable heat release pattern, low NOx and CO emissions, as well as controlled velocity at the glass surface to prevent excessive volatile generation from the melt surface.

Low pressure fuels may be compressed to higher pressures in order to increase the momentum and velocity of the fuel jets for industrial applications. However, this method in general requires a great deal of safety measures and redundancies to attain safe operations, which increases the fuel compression costs quickly. Fuel compression is also limited by available engineering materials and is subjected to maximum fuel temperatures allowed. For example, a high temperature and low pressure syngas fuel at a supply pressure of about two inches of water column (i.e., 2"-H2O) and its composition comprises CO, H2, CH4, and soot would be very costly to compress even at a moderate temperature of less than 500 F. For the syngas from TCR preheated above 2000 F there is no practical way of compressing the stream.

The pressure of the motive gas stream is utilized to direct and deliver low velocity fuels into a combustion enclosure with the use of nozzles to create high velocity streams of the motive gas, especially where the motive gas is oxidant. These nozzles can be made of high temperature refractory materials and, optionally, be mounted on the tips of water- or air-cooled metal lances for use. Since oxygen can be provided from commercially available sources such as VPSA apparatus or liquid oxygen supply at sufficiently high pressures to serve as the first and second oxidant streams, the present invention does not require costly fuel compression equipment and is easy, safe and very economical to apply.

The current method and apparatus for low-velocity fuel combustion also has the added benefits of lowering NOx emissions and reducing peak flame temperatures, because the low velocity fuel is converted to a higher velocity mixed stream and combusted by at least two oxidants supplied to the combustion enclosure in a staged combustion manner, as described in U.S. Pat. Nos. 6,394,790 and 5,601,425.

Yet another technical advantage of the present invention is that furnace overall flow patterns and flow characteristics can be altered or modified through distinct nozzle designs so that adequate amounts of flow momentum and stream flow angles are provided to the motive gas stream and the secondary oxidant stream.

The following description refers to the drawings, including FIGS. 4, 4*a*, 5, 5*a*, 6-7, 7*a*-7*c* and 8, to describe representative practice and operation of the current invention in a glass furnace equipped with thermochemical heat regenerators (TCR) for flue gas heat recovery of the type described in U.S. Pat. No. 6,113,874.

Figure 4:
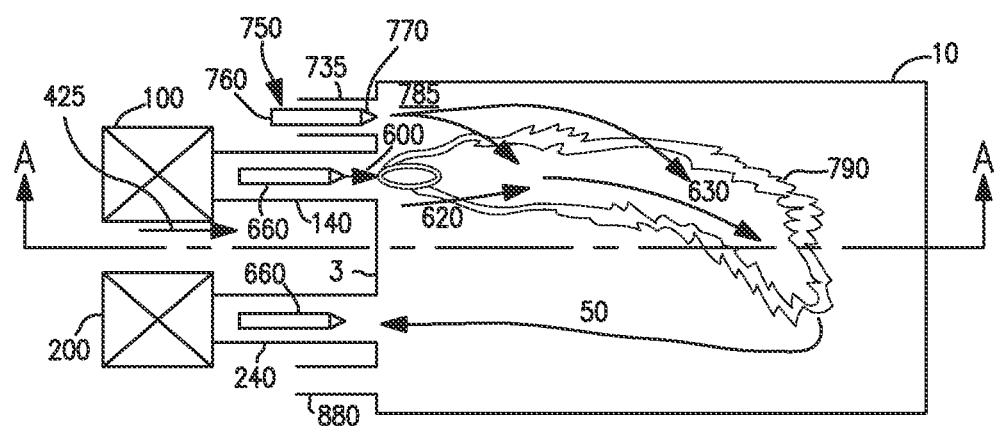
FIG. 4 is a top view of a glass furnace in which the invention is implemented.
Figure 5:
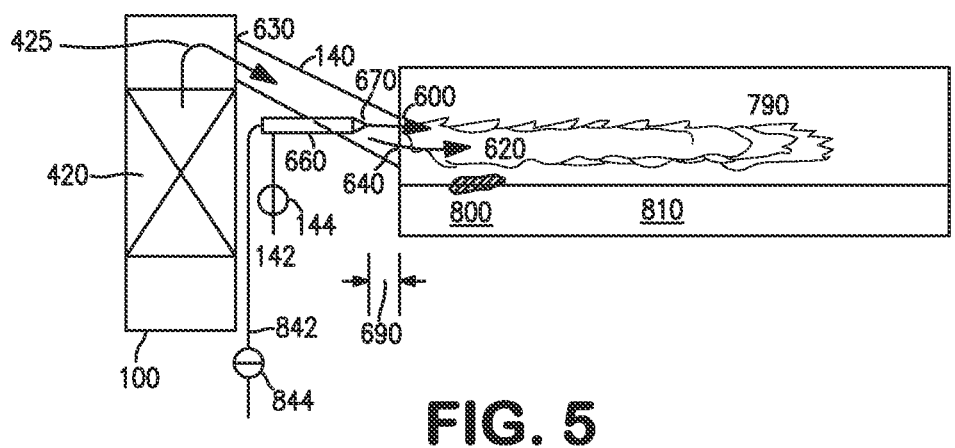
FIG. 5 is a side view of the glass furnace shown in FIG. 4, seen in cross-section taken along line A-A of FIG. 4.

Glass furnace (10) has regenerator (100) on the left side of wall (3) of the furnace and regenerator (200) on the right side of wall (3). As described above, regenerators (100) and (200) are each connected to ducts, also referred to herein as port necks (140) and (240) respectively, which connect to the interior of glass furnace (10). In FIGS. 4 and 5, regenerator (100) is shown in the reforming cycle in which syngas (425) is produced by thermochemical reforming of fuel and recycled furnace flue gas in checker pack (420). This syngas stream (425) is usually comprised of CO, H2, CH4, CO2, N2, other hydrocarbon species and soot. It has a temperature typically higher than 2000 F or 2100 F and a weight average molecular weight lower than 18, or even lower than 14 (i.e., the gas density is below 0.01 or even below 0.007 lb/ft$^3$), but its pressure is very low, on the order of less than 0.1 or even less than 0.5 inch-water-column (0.1" or even less than 0.5"-H2O) above the furnace ambient pressure. Syngas stream (425) enters port neck (140) through a plane (630) and exits into the furnace for combustion through plane (640) which is the plane of the interior surface of wall (3).

Figure 5A:
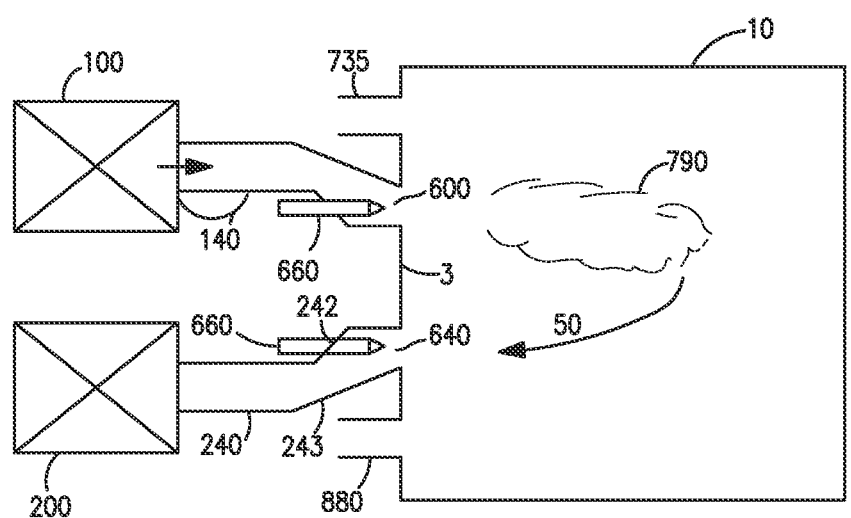
FIG. 5a is a top view of an alternative embodiment of a glass furnace in which the invention is implemented.

Referring to FIG. 4, FIG. 5 and FIG. 5*a*, motive gas stream (142) passes through valve (144) to a metal lance (660) which has refractory nozzle (670). Lance (660) is described with reference to FIG. 8, which includes motive gas stream (142), valve (144), fuel feed line (842), valve (844), port neck (140), and furnace (10), which are described in other drawing figures as well. Central passageway (848) and annular passageway (846) are provided, preferably concentric with each other. Preferably, motive gas is fed through central passageway (848) and fuel is provided through annular passageway (846). Around annular passageway (846) is provided a jacket (853) of cooling air which enters through air inlet (851) and exits through air outlet (852). Openings (854) are provided in jacket (853) so that some of the cooling air can pass from jacket (853) to help keep nozzle (846A) at the end of passageway (846), and nozzle (848A), at the end of passageway (848), cooled and clean as when passage of fuel resumes the fuel will have a lesser tendency to crack and form soot which could foul the nozzle and deflect the axis of the flame whose base would be at the nozzle. The end (848A) of passageway (848) is preferably recessed by up to two refractory fuel port inside diameters from the end of nozzle (670), and the end of nozzle (670) is preferably recessed by up to two fuel port inside diameters from the opening into port neck (140).

The motive gas stream (142) can be a portion of the combustion oxidant that is used to combust the syngas or other fuel gas which is being fed to the furnace. The refractory nozzle (670) is preferably designed to have a throughput of 10% of the total combustion oxidant flow and the oxidant injection velocity was choked at sonic velocity of about 980 ft/sec. The lance and the nozzle assembly are installed inside port neck (duct) (140) with the discharge end of nozzle (670) recessed a distance (690) from the plane (640) which is defined above. The nozzle (670) can comprise numerous holes (not shown) in its discharge end which when are preferably designed so that oxidant flows through the holes in direction(s) to avoid overheating of refractories inside port neck (140).

During the cycles of operation in which the motive gas stream (142) is flowing, it passes out of nozzle (670) as a high velocity stream that entrains much of the low velocity syngas (425) thereby forming a mixed fuel stream (600) in the port neck (duct) (140). The mixed stream (600) passes from inside duct (140) out into furnace (10). The mixed fuel stream has a sufficient momentum to resist lofting upwards toward the top (crown) of furnace (10) and to instead penetrate into the interior of furnace (10) in a preferred direction (630) aided by the design of the refractory nozzle (670) to minimize or avoid the flame touching or impinging on the interior walls and crown of the furnace.

FIG. 4a illustrates an embodiment in which there are two nozzles (660) which are positioned at a diverging angle with respect to each other. Streams of motive gas pass out of both nozzles (660) inside the duct (140) to mix with stream (425) inside duct (140) and the resulting mixed stream (600) passes from the duct into the interior of furnace (10).

Of course, while both regenerators (100) and (200) have lances (660) to be used to inject motive gas when the regenerator is operated in the reforming cycle, motive gas is fed from only the lance (660) that is associated with the regenerator which is operating in the reforming cycle.

Figure 6:
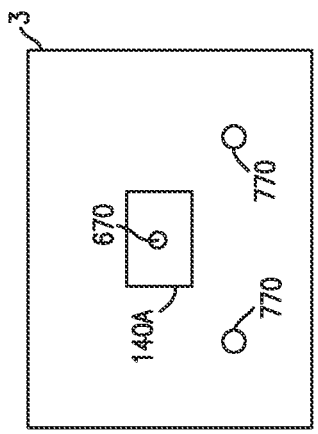
FIG. 6 is a front plan view of a side of the glass furnace of FIGS. 4 and 5, viewed from inside the furnace.

One or more secondary oxidant streams (750) can be supplied to the furnace interior, each through its own lance (760) and nozzle (770) assembly inside a refractory block (735) for the injection of the balance of the combustion oxidant for complete combustion of the syngas or fuel gas. Low velocity syngas (620) that was not entrained into the motive gas stream (142) can be entrained into the secondary oxidant stream (785) that passes into the furnace for combustion. Injection holes in nozzle(s) (770) are designed so that the secondary oxidant entrains surrounding furnace gases before mixing with the unburned syngas or fuel gas stream propelled by the motive gas stream (142) so that a desired main flame (790) is formed for heating a charge in the furnace, such as for glass melting. The main flame (790) provides radiative and convective heat energy to the charge (800 and 810) in the furnace which may include solids (800) (such as batch and/or cullet materials for glassmaking) and molten liquid (810). Flue gas (50) from the furnace interior is directed to regenerator (200) to preheat checkers therein as described above. FIG. 6 is a view looking at a portion of wall (3) from inside the furnace. As seen in FIG. 6, nozzles (770) are located below the horizontal center line of the outlet (140A) of duct (140), and are preferably below the duct outlet (140A). While two nozzles (770) are depicted, there are preferably two to four such nozzles (770) at each outlet (140A).

In actual preferred practice as represented in FIG. 2, additional injectors for fuel gas or syngas, for a motive gas stream and for secondary oxidant streams, functionally equivalent to those described above, would also be installed in port neck (duct) (240) and refractory block(s) (835) on the furnace right side, though not shown in FIGS. 4 and 5. Fuel (942) is also shown in FIG. 2. These injection devices would be used when the TCR process has undergone a reversal to a cycle in which syngas is produced in regenerator (200) and the furnace flue gas is directed to regenerator (100) to preheat checker pack (420).

Yet another advantage of the present invention is that the use of the motive gases allows proper distribution of low velocity reactants into a furnace under which the ducts connecting to the furnace and regenerators are not straight but angled in vertical or horizontal directions with respect to the direction of a regenerator.

Referring to FIG. 5a, port neck (140) is shown to have a sharp angle with respect to the upward direction of regenerator (100). The height of the regenerator crown (432) is about 7.5 ft higher than the glass surface (811) in furnace (10). This unusually large difference in height is because the regenerator was installed on the existing basement levels without excavation. In this case, the high momentum motive gas issues from lance (660) also provides a "pumping" effect to draw the low velocity, low density, and highly buoyant syngas (425) from the higher elevation regenerator top space toward the lower elevation furnace combustion space. This pumping effect beneficially reduces the pressure requirement that the blower (300, FIG. 1) has to develop on the pressure side, thus reduces process operating costs. Furthermore, because port neck (240) is also sharply angled like port neck (140), flame (790) and hot walls in furnace (10) have no direct views on the colder regenerator top space (530, FIG. 2) of the regenerator (200) that is in the flue cycle. This obstructed view from the hot furnace to the colder regenerator top space reduces direct radiation heat transfer from the furnace (10) to the regenerator (200), which reduces port radiation losses to the furnace ambient and increases the TCR heat recovery efficiency.

The present invention can also be applied to for example glass furnaces where port necks are angled in horizontal directions and connected to the regenerators. This application of motive lances may occur when the top course of the checker pack (420) is almost at the same elevation of the glass surface (811), thus the elevation of the regenerator crown is approximately at the same level as the furnace crown. FIG. 5a illustrates such a TCR heat recovery arrangement viewed from above where port necks (140, 240) are angled in the horizontal directions and motive lance (660) is installed in port neck (140) of the reforming regenerator (100). In this case, radiative heat fluxes exiting from the furnace through a plane (640) at the furnace back wall (3) is partially blocked and reflected back to the furnace (10) by the angled walls (242, 243) of the port neck (240), thus having similar effect in reducing port radiation heat losses and enhancing the heat recovery efficiency of the TCR process.

Other preferred operating conditions are as follows:

Each oxidant stream should have an oxygen concentration greater than 50% by volume, preferably greater than 75% by volume.

Each motive gas stream as fed into the duct to mix with a fuel stream or other stream should have a velocity of 200 ft/sec up to sonic velocity or even supersonic velocity at the nozzle exit. For point of reference, if the pressure of the combustion enclosure (furnace) is 1 atm, then the sonic velocity for O2 (70F inlet) at a nozzle exit is 980 ft/sec; for 70F air, sonic velocity at a nozzle exit is 1030 ft/sec)

A motive gas that is fed into a given fuel stream should preferably comprise (by volume) 1% to 50% (more preferably 5% to 30%, and even more preferably 5% to 15%) of the total combustion oxygen that is fed into the furnace for combustion of the fuel in that fuel stream.

At least 50 vol. %, preferably 70 vol. % and more preferably at least 90 vol. % of the fuel gas or syngas is entrained into the motive gas stream in the fuel duct, forming the mixed stream that passes into the furnace. As described above, the ratio of the mass flow rate of the syngas or other fuel gas that is entrained, to the mass flow rate of the motive gas injected, is approximately proportional to the ratio of L and D, that is, the recess distance L divided by the diameter D of the motive gas nozzle, wherein the recess distance L is defined as the distance (690) along the axis of the lance (660) between the injection point in the duct to the duct exit plane to the furnace, i.e., to the interior surface of the furnace interior where the duct ends. The preferred range of the L/D ratio for the duct depends on the number of streams of motive gas fed into the duct, N, and the ratio R of the total mass flow rate of syngas passing through the duct to the total mass flow rate of motive gas stream being fed into the duct. When these parameters are combined with L expressed in the same units as D, and the mass flow rates on which R is based are expressed in the same units so that R is dimensionless, then the expression (L/D)×(N/R) is preferably between 5 (or even 4) and 25, more preferably between 8 and 15 or 16. This relationship can be satisfied by providing appropriate values of any one or more of L, D, N and R, in each given operational situation so as to provide the desired value of the expression (L/D)×(N/R). That is, L can be provided by positioning of each nozzle (670) within the duct, D can be provided by providing a nozzle (670) with the desired diameter, an appropriate number N of lances (660) and nozzles (670) can be provided in the duct wherein each lance (660) is fed motive gas as described herein, and the value of R can be provided by implementing appropriate total mass flow rates of the syngas and of the motive gas.

Preferably all of the motive gas that is fed into a given duct is fed through one or more lances (660) (i.e. a total of N lances) positioned in the duct. The preferred number of motive gas streams in a duct, N, is determined by the size and shape of the cross-sectional area of the duct and the desired flame shape in the furnace. When the cross-sectional area of the duct is large two to four, or even six or more, motive gas streams, each fed through its own lance (660), may be appropriate to achieve 50 to 90% (preferably 70 to 90%) entrainment of syngas into the motive gas within the duct space available. The direction of each motive gas stream can be adjusted to form different flame shapes in combination with the direction and number of secondary oxidant streams. FIG. 6 illustrates an embodiment in which there is one nozzle (670) corresponding to one lance (660) for the duct, that is, N equals one. Where two or more than two nozzles (670) are employed in a duct, the expression (L/D)×(N/R) is determined with N being the total number of nozzles feeding motive gas into the duct and with R being determined on the basis of the total mass flow rate of syngas passing through the duct and the total mass flow rate of motive gas being fed through all N of the nozzles. Suitable dimensions L and D and suitable mass flow rates for the syngas and the motive gas that may be employed in practice will depend on factors including the overall size and firing rate per port of the furnace with which the invention is employed. Thus, representative non-limiting values of L can be 10 to 80 inches; of D, ¼-inch to 1 inch; of syngas mass flow rate, 1000 to 4000 pounds per hour (lbs/hr); and with the motive gas mass flow rate selected as described herein with reference to values including the mass flow rate ratios, oxygen contents, and velocities described herein. The present invention can also be practiced in embodiments in which the motive gas does not have to contain oxygen. Instead, the motive gas can be any gas, including steam, compressed air, natural gas, carbon dioxide, compressed recycled flue gas, or any other gaseous composition that is compatible with the furnace.

Multiple motive gas streams may be used to regulate the shape of a flame in the furnace so that the flame is wide and also has suitable length and directions for applications use. The need for wider flames is especially critical in a so-called cross-fired furnace when the furnace length in the longitudinal direction is large. For example in an air-fuel fired furnace making float glass five to seven pairs of regenerator ports are placed on the side walls of the furnace. Each flame projects cross-wise from one side wall to the opposite side wall and the multiple flames provide good flame coverage over a large surface area of the furnace where melting of the batch/cullet and fining of glassmelt occur continuously. When such a furnace is converted to oxy-fuel firing with the TCR heat recovery system, it is desirable to reduce the number of the TCR ports in order to reduce wall heat losses and to reduce the cost of the conversion. However, when the numbers of ports are reduced, the number of flames is reduced and the flame coverage is reduced, especially since the size of the oxy-fuel flame is generally much smaller than that of the air flame of the same firing rate. This problem of low flame coverage can be overcome by creating a wide flame from each port that covers greater surface area. Multiple motive gas streams may be supplied to a duct by corresponding number of lances (660) with each lance having one or more nozzles (670). Each nozzle may have single or multiple orifices where a motive gas flows through. If multiple orifices are provided in a nozzle, then the orientation and size of each orifice may or may not be the same. These motive lances can be located and staggered in a vertical or horizontal direction or any appropriate locations of a duct cross-section area where the low velocity fuel or oxidant flows through then enters the furnace. It is expected that the arrangement of these lances which house multiple motive gas streams for creating a wide flame may depend on the shape and the cross-section area of the duct. It is also important to note that the number of these motive lances applicable in a duct may be limited by the available duct cross-section area. This is because each motive lance (660) may need sufficient separation distance from the other lances in the same duct so that the mixed streams (600) from each nozzle orifices are not interfering with each other for the ongoing development of a wide flame at the duct exit (640) and in the furnace (10).

Figure 7A:
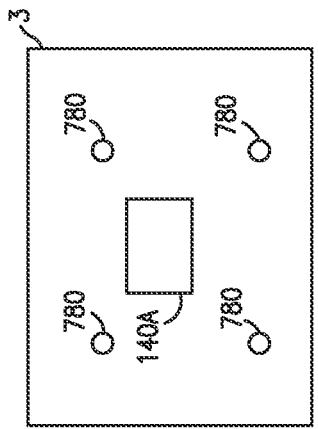
FIGS. 7a, 7b and 7c are front plan views of a side of a glass furnace showing alternative embodiments of the invention.
Figure 7C:
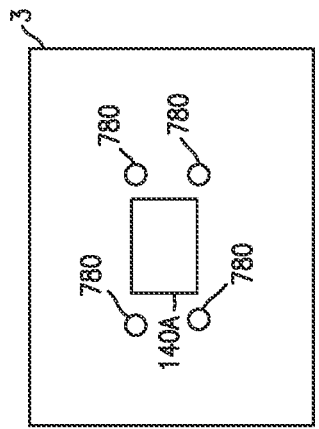
Figure 7B:
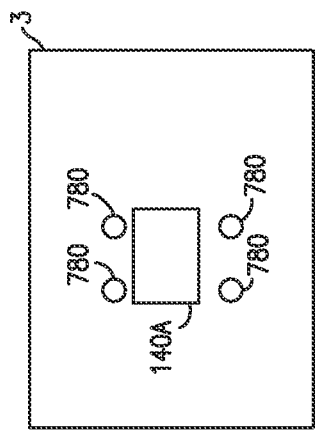

The present invention can also be practiced in alternate embodiments in which the motive gas is not used in the fuel stream before the fuel stream (syngas) enters the furnace. In these embodiments, high velocity oxidant streams are injected into the furnace in close proximity to the port opening where the fuel stream enters the furnace. Each oxidant stream entrains surrounding furnace gas and a portion of the low velocity fuel stream. The entrained furnace gas acts as a diluent to reduce the local flame temperature, makes the flame length longer, and also helps to reduce the formation of NOx. In these embodiments the oxidant streams are injected through openings that are spaced around the fuel port opening and are injected at velocity greater than 100 ft/sec, preferably greater than 150 ft/sec, and more preferably greater than 200 ft/sec so as to entrain most of the low velocity fuel stream into the oxidant streams for combustion and prevent the formation of uncontrolled flame lofting to the crown or short-circuiting to the flue gas exhaust port. In a preferred arrangement two to eight oxygen injectors are placed around each port through which fuel (syngas) is injected into the furnace. Examples using four oxygen streams are shown in FIGS. 7a, 7b and 7c, which are views looking at a portion of wall (3) from inside the furnace. As seen in these figures four oxidant nozzles (780) are located around the duct opening (140A) and four separate oxidant jet streams are issued. When oxidant nozzles are spaced apart widely from the duct opening, as seen in FIG. 7a, the oxidant stream issuing from each oxidant nozzle entrains more surrounding furnace gas and dilute the concentration of the oxidant jet before it entrains the low velocity fuel stream coming out of the duct outlet (140A). The resulting flame has a lower flame temperature. When oxidant nozzles are located closer to the duct opening, as seen in FIGS. 7b and 7c, the oxidant stream issuing from each oxidant nozzle entrains less surrounding furnace gas before it entrains the low velocity fuel stream coming out of the duct outlet (140A). The resulting flame has a higher flame temperature. Thus, the shape and overall direction of the flame as well as the flame temperature can be controlled by the total number of oxidant nozzles, the location and angle of each nozzle, and the oxidant flow rate from each nozzle and the jet velocity. Preferably the axis of each oxidant injection nozzle is placed in the end wall separated between 3 inches to 30 inches from the interior perimeter of the fuel port connected to the inside surface of the firing wall. More preferably the axis of each oxidant injection nozzle is placed in the firing wall separated between 5 inches to 20 inches from the interior perimeter of the fuel port connected to the inside surface of the firing wall.

It has been found that a good flame shape and heat distribution pattern can be obtained in an oxy-fuel fired end-port furnace with TCR as described herein, with fuel ports from which fuel is injected into the furnace, with motive gas injected as described herein, and with conduit (70) or the like as exhaust port through which gaseous combustion products ("flue gas") exit the furnace to the exhaust, when the following flow conditions are met.

(1) The total of the momentum "O" of oxygen, the momentum "M" of the motive gas, and the momentum "F" of the fuel (syngas) flows injected into the furnace is at least 100%, preferably greater than 150%, or even greater than 300%, of the momentum "X" of the flue gas flow exiting the exhaust port.

(2) The low velocity syngas flow and surrounding furnace gas are entrained into the motive gas stream and the oxidant streams, and projected toward the front wall.

(3) Ports (see FIGS. 7a, 7b and 7c) are placed in the end wall with a sufficient separation distance between them and away from the nearest side wall, or ports are located close to the side walls and motive gas and oxygen jets are angled away from the nearest side wall to prevent fuel rich zone of the flame touching the side wall.

It will be recognized that the values for the momentum of the oxidant, motive gas, and fuel (syngas) streams fed into a furnace, and for the momentum of the gaseous combustion products (flue gas) that exits the furnace, depend on the firing rate of the furnace. In furnaces such as glass furnaces, the typical firing rates can be on the order of 5 million to 60 million BTU per hour per firing port (i.e. the ports at which combustion occurs in the furnace). For furnaces having firing rates of this magnitude, typical values for the respective momentums are on the order of 120,000 to 1,500,000 pounds/hour times feet per second (lb/hr*ft/sec) for the momentum of the oxidant (referred to herein as "O"); on the order of 90,000 to 1,100,000 (lb/hr*ft/sec) for the momentum of the motive gas (referred to herein as "M"); on the order of 10,000 to 120,000 (lb/hr*ft/sec) for the momentum of the fuel gas (referred to herein as "F"); and on the order of 60,000 to 700,000 (lb/hr*ft/sec) for the momentum of the gaseous combustion products (referred to herein as "X").

If the oxygen jets are placed close to the nearest side wall and injected toward the front wall, parallel to the side walls, the oxygen jets would bend toward the side wall due to the Coanda effect, resulting in fuel rich flame touching the side wall. This condition can be avoided by angling the oxygen jets away from the side wall. The optimum angle of oxygen jets depends on the furnace configuration and the placement of oxygen jets.

In the present invention the momentum of each oxidant stream is preferably larger than that of the fuel stream. Therefore, flow field characteristics in the furnaces, such as flow directions, velocity magnitudes, and the location of the flow recirculation zones, are strongly influenced and mostly determined by the directions (i.e., vector angles) and the magnitude of the momentums designed for each oxidant stream. The capability to modify furnace flow characteristics by varying the flow condition of each oxidant stream is particularly advantageous for creating a desired flame shape, achieving optimized thermal performance and a desired temperature distribution in the furnace. Furthermore it helps to design a flame to minimize NOx emissions and particulate carry-over, and to achieve the highest fuel energy utilization efficiency in a glass furnace.

When an oxy-fuel fired furnace with a thermochemical regenerator was arranged in the end-port configuration, the overall flow pattern in the furnace was found to be different from that of an air fired regenerative furnace. When the conventional air flame design was applied to the TCR flame design, some of the low velocity reformed fuel coming out of the firing port was short-circuited to the exhaust port and created an undesirable heating pattern in the furnace. The present inventors found that the key flow parameters preventing short-circuiting of either fuel or oxygen flow to the exhaust port is to make the total momentum of oxygen and fuel flows injected into the furnace is at least 100%, preferably 150% of the momentum of flue gas flow exiting the exhaust port. Furthermore if either fuel of oxygen flow has less than 30% of the momentum of the flue gas exiting the exhaust port, the weaker flow must be quickly entrained into the stronger flow near the injection port and projected toward the front wall.

The present invention can also be practiced in embodiments in which the second oxidant may not provide the balance of the oxygen required to completely combust the fuel entering the furnace. It can be advantageous to provide the amount of oxygen required to completely combust the fuel (after the mixed stream including the motive gas has propelled the fuel into the furnace) from two or more oxidant streams that have significantly different injection locations. For example, a second oxidant stream is injected in close proximity to the location where the mixed fuel stream enters the furnace, while a third oxidant stream is fed after the second oxidant stream has been substantially consumed in the flame. A typical location for this third oxidant stream is closer to the opening where the flue gas exits the furnace. The advantage of this arrangement of oxidant streams is the reduction of NOx formation by the combustion process. This method of staging the combustion process to reduce NOx emissions is well known, but the combination with the combustion process for a very low momentum fuel stream is new.

What is claimed is:

1. A method of carrying out combustion in a furnace, comprising
   (A) combusting fuel in a furnace to produce gaseous combustion products; and
   (B) carrying out the following sequence of steps (1) through (4):
      (1) (i) passing a portion of the gaseous combustion products into and through a cooled first regenerator to heat the first regenerator and cool said portion of the gaseous combustion products,
      (ii) passing at least part of said cooled portion of gaseous combustion products from said first regenerator, and gaseous fuel, into a heated second regenerator and, in the second regenerator, reacting the gaseous combustion products and the gaseous fuel in an endothermic reaction in the second regenerator to form syngas comprising hydrogen and CO, (iii) passing said syngas formed in the second regenerator at a velocity less than 50 feet per second into a first duct having an outlet that is connected to the interior of the furnace,
(iv) injecting at least one stream of motive gas having a velocity of at least 100 feet per second from a first nozzle in the first duct into the syngas in the first duct upstream from the interior of the furnace, thereby entraining the syngas into the motive gas stream in the first duct and forming in the first duct a mixed stream comprising a mixture of the syngas and the motive gas and having a velocity greater than 50 feet per second, and
(v) passing said mixed stream in the first duct at a velocity of greater than 50 feet per second from said first duct into said furnace and combusting the mixed stream with one or more oxidant streams injected into said furnace; and then (2) (i) discontinuing the passage of said gaseous fuel into the second regenerator, continuing to pass cooled gaseous combustion products into and through said second regenerator thereby removing said gaseous fuel and syngas from the second regenerator and lowering the concentration of said gaseous fuel and syngas in the second regenerator, feeding fuel and gaseous oxidant out of the first nozzle in the first duct and combusting them to generate heat of combustion which heats the interior of the furnace, and thereafter discontinuing the injection of said gaseous oxidant from said first nozzle in the first duct, so that only said fuel is being passed out of the first nozzle, and combusting said fuel with said one or more oxidant streams injected into said furnace; and thereafter
(ii) discontinuing the flow of said fuel out of the first nozzle into the first duct, and discontinuing combustion of said fuel out of said first nozzle, and discontinuing passage of gaseous combustion products from the furnace through the first regenerator; and then (3) (i) passing a portion of the gaseous combustion products into and through a cooled second regenerator to heat the second regenerator and cool said portion of the gaseous combustion products,
(ii) passing at least part of said cooled portion of gaseous combustion products from said second regenerator, and said gaseous fuel, into a heated first regenerator and, in the first regenerator, reacting the gaseous combustion products and the gaseous fuel in an endothermic reaction in the first regenerator to form syngas comprising hydrogen and CO,
(iii) passing said syngas formed in the first regenerator at a velocity less than 50 feet per second into a second duct having an outlet that is connected to the interior of the furnace,
(iv) injecting at least one stream of motive gas having a velocity of at least 100 feet per second from a second nozzle in the second duct into the syngas in the second duct upstream from the interior of the furnace, thereby entraining the syngas into the motive gas stream in the second duct and forming in the second duct a mixed stream comprising a mixture of the syngas and the motive gas and having a velocity greater than 50 feet per second, and
(v) passing said mixed stream in the second duct at a velocity of greater than 50 feet per second from said second duct into said furnace and combusting the mixed stream with one or more oxidant streams injected into said furnace; and then (4) (i) discontinuing the passage of gaseous fuel into the first regenerator, continuing to pass cooled gaseous combustion products into and through said first regenerator thereby removing fuel and syngas from the first regenerator and lowering the concentration of fuel and syngas in the first regenerator, feeding fuel and gaseous oxidant out of the second nozzle in the second duct and combusting them to generate heat of combustion which heats the interior of the furnace, and thereafter discontinuing the injection of said gaseous oxidant from said second nozzle in the second duct, so that only said fuel is being passed out of the second nozzle, and combusting said fuel with said one or more oxidant streams injected into said furnace; and thereafter
(ii) discontinuing the flow of said fuel out of the second nozzle into the second duct, and discontinuing combustion of said fuel out of said second nozzle, and discontinuing passage of gaseous combustion products from the furnace through the second regenerator; and then (C) repeating step (B) at least once.

2. A method according to claim 1 wherein each nozzle is a motive jet nozzle, and further wherein each motive jet nozzle has an internal diameter D, and is located an upstream distance L from the interior wall of the furnace, and the value of (L/D)×(N/R) is from 4 to 25, wherein N is the number of streams of motive gas injected into the syngas in the duct and R is the ratio of the total mass flow rate of syngas passed into the duct to the total mass flow rate of the stream, or all of the streams, of motive gas injected into the duct.

3. A method according to claim 1 wherein said motive gas in the first duct and said motive gas in the second duct comprises oxygen.

4. A method according to claim 1 wherein said motive gas in the first duct and said motive gas in the second duct has an oxygen content of at least 75 vol. % oxygen.

5. A method according to claim 1 wherein said motive gas in the first duct and said motive gas in the second duct comprises air.

6. A method according to claim 1 wherein the oxygen content of the mixture of motive gas and syngas in the first duct and the oxygen content of the mixture of said motive gas in the second duct is less than the stoichiometric requirement for complete combustion of the syngas in the mixture in the first duct and the mixture in the second duct, and wherein one or more secondary streams of gaseous oxidant comprising oxygen is injected into the furnace to combust with the remainder of the syngas in the mixture in the first duct and the mixture in the second duct.

7. A method according to claim 6 wherein the one or more secondary streams of gaseous oxidant is injected from below the center line of the outlet from the first or second duct into the furnace.

8. A method according to claim 6 wherein the one or more secondary streams of gaseous oxidant is injected from below the outlet from the first or second duct into the furnace.

9. A method according to claim 1 wherein said fuel and said syngas in said first duct and said fuel and said syngas in said second duct are combusted in said furnace with oxidant comprising at least 75 vol. % oxygen.

10. A method according to claim 1 wherein the syngas that is passed into said first duct and the syngas that is passed into said second duct are passed at a velocity less than 50 feet per second.

11. A method according to claim 1 wherein said at least one stream of motive gas injected into the syngas in the first duct has a velocity of at least 400 feet per second and said at least one stream of motive gas injected into the syngas in the second duct has a velocity of at least 400 feet per second.

12. A method according to claim 1 wherein the mass flow rate of the motive gas injected into the syngas in the first duct and into the syngas in the second duct is less than 30% of the mass flow rate of the syngas into which the motive gas is injected.

13. A method according to claim 1 wherein the mass flow rate of the motive gas injected into the syngas in the first duct and into the syngas in the second duct is less than 15% of the mass flow rate of the fuel into which the motive gas is injected.

14. A method according to claim 1 wherein the motive gas injected into the first duct and into the second duct comprises oxygen and the mass flow rate of the motive gas injected into the syngas in each duct provides between 5% to 35% of the stoichiometric mass flow rate of oxygen required for complete combustion of the syngas into which the motive gas is injected.

15. A method according to claim 1 wherein said mixed stream passed from said first duct into said furnace and said mixed stream passed from said second duct into said furnace are passed at a velocity greater than 100 feet per second.

16. A method according to claim 1 wherein at least 70 vol. % of the syngas is entrained into the motive gas stream in said first and second ducts to thereby form in said ducts said mixed stream in the first duct and said mixed stream in the second duct.

17. A method according to claim 1 wherein the density of the syngas which is entrained into the motive gas in the first duct and said density of the syngas which is entrained into the motive gas of the second duct is lower than the density of the gaseous products formed by said combustion of the mixed stream in the corresponding first duct and the second duct.

18. A method according to claim 1 wherein the furnace contains a charge to be heated by combustion of the fuel in the furnace, wherein said combustion creates an oxidizing atmosphere over the charge in said furnace.

19. A method according to claim 1 wherein said combustion of the mixed stream in the first duct and the mixed stream in the second duct with one or more oxidant streams injected into said furnace forms a flame that does not visibly touch interior walls or a ceiling in the furnace.

* * * * *